United States Patent
Frasca et al.

(10) Patent No.: US 10,469,571 B2
(45) Date of Patent: *Nov. 5, 2019

(54) BLOCK ALLOCATION BASED ON SERVER UTILIZATION

(71) Applicant: Amazon Technologies, Inc., Seattle, WA (US)

(72) Inventors: Michael Robert Frasca, Cambridge, MA (US); Matteo Frigo, Acton, MA (US); Jacob A. Strauss, Boston, MA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/783,857

(22) Filed: Oct. 13, 2017

(65) Prior Publication Data

US 2018/0041572 A1 Feb. 8, 2018

Related U.S. Application Data

(62) Division of application No. 14/500,435, filed on Sep. 29, 2014, now Pat. No. 9,794,331.

(51) Int. Cl.
*H04L 29/08* (2006.01)
*H04L 12/26* (2006.01)

(52) U.S. Cl.
CPC ...... *H04L 67/1008* (2013.01); *H04L 43/0876* (2013.01); *H04L 67/1095* (2013.01); *H04L 67/1097* (2013.01)

(58) Field of Classification Search
CPC ............. H04L 67/1008; H04L 67/1095; H04L 67/1097; H04L 43/0876

USPC .................................................. 709/223, 248
See application file for complete search history.

(56) References Cited

U.S. PATENT DOCUMENTS

| | | | | |
|---|---|---|---|---|
| 7,849,223 B2* | 12/2010 | Malkhi | ................... | H04L 67/34 709/248 |
| 7,937,482 B1* | 5/2011 | Vermeulen | .......... | G06F 11/1425 709/229 |
| 8,793,531 B2* | 7/2014 | George | ................. | G06F 3/0613 714/6.3 |
| 9,274,863 B1* | 3/2016 | Qiu | ...................... | G06F 11/1474 |
| 9,294,558 B1 | 3/2016 | Vincent et al. | | |
| 10,121,025 B1* | 11/2018 | Rice | ....................... | H04L 9/0643 |
| 2005/0283644 A1* | 12/2005 | Lorch | ................... | G06F 11/182 714/4.4 |

(Continued)

*Primary Examiner* — Michael Won
(74) *Attorney, Agent, or Firm* — Davis Wright Tremaine LLP

(57) ABSTRACT

A computing resource service provider may operate a data storage service configured to provide data storage for one or more customers of the computing resource service provider. The data storage service may store customer data in one or more replicated state machines, where the replicated state machines comprise a plurality of replicated state machine-shards. The replicated state machine-shards may cause the computer system hosting the replicated state machine-shard to transmit a consensus message to other computer system. The consensus message may include utilization information corresponding to the other computer system. The utilization information may be used to calculate a utilization rate for the replicated state machine usable in block allocation operations.

20 Claims, 8 Drawing Sheets

(56) References Cited

U.S. PATENT DOCUMENTS

| | | | |
|---|---|---|---|
| 2008/0189769 A1 | 8/2008 | Casado et al. | |
| 2009/0089078 A1* | 4/2009 | Bursey | H04W 4/70 |
| | | | 705/300 |
| 2009/0089300 A1* | 4/2009 | Vicente | H04L 41/0893 |
| 2010/0199042 A1* | 8/2010 | Bates | G06F 11/2064 |
| | | | 711/114 |
| 2011/0258461 A1 | 10/2011 | Bates | |
| 2011/0296052 A1 | 12/2011 | Guo et al. | |
| 2012/0110651 A1* | 5/2012 | Van Biljon | G06Q 30/04 |
| | | | 726/4 |
| 2012/0254175 A1* | 10/2012 | Horowitz | G06F 16/278 |
| | | | 707/737 |
| 2012/0254412 A1 | 10/2012 | Goose et al. | |
| 2014/0245026 A1 | 8/2014 | Bates | |
| 2014/0280452 A1 | 9/2014 | Aahlad et al. | |
| 2015/0186229 A1* | 7/2015 | Bortnikov | G06F 11/2028 |
| | | | 714/4.11 |
| 2015/0278244 A1 | 10/2015 | Shvachko et al. | |
| 2016/0119217 A1 | 4/2016 | Tanous et al. | |
| 2016/0308982 A1* | 10/2016 | Greene | G06Q 10/063112 |
| 2017/0024453 A1* | 1/2017 | Raja | G06F 16/278 |
| 2017/0121304 A1* | 5/2017 | Jaworsky | C07D 401/04 |
| 2017/0193002 A1* | 7/2017 | Shvachko | G06F 16/182 |
| 2017/0286516 A1* | 10/2017 | Horowitz | G06F 11/0709 |
| 2018/0121304 A1* | 5/2018 | Liaw | G06F 11/2094 |
| 2018/0152289 A1* | 5/2018 | Hunt | H04L 9/0637 |
| 2018/0217888 A1* | 8/2018 | Colgrove | G06F 11/0727 |
| 2018/0253452 A1* | 9/2018 | Callan | H04L 9/3247 |
| 2018/0285840 A1* | 10/2018 | Hasan | G06Q 20/0655 |
| 2018/0357019 A1* | 12/2018 | Karr | G06F 3/0685 |
| 2019/0068380 A1* | 2/2019 | Tang | G06F 16/2379 |
| 2019/0129895 A1* | 5/2019 | Middleton | G06F 16/2379 |
| 2019/0172026 A1* | 6/2019 | Vessenes | G06Q 20/0658 |

\* cited by examiner

BLOCK ALLOCATION BASED ON SERVER UTILIZATION

CROSS REFERENCE TO RELATED APPLICATION

This application is a divisional of U.S. patent application Ser. No. 14/500,435, filed Sep. 29, 2014, now U.S. Pat. No. 9,794,331, entitled "BLOCK ALLOCATION BASED ON SERVER UTILIZATION," the disclosure of which is hereby incorporated herein in its entirety.

BACKGROUND

The use of remote computing services, such as remote program execution and remote data storage, has greatly increased in recent years. Customers may reduce expenses and overhead by purchasing these services from a computing resource service provider (also referred to as a service provider). Customer applications may be distributed over multiple virtual machine instances and computing systems. The virtual machine instances may be controlled by a hypervisor operating on a computing system. The hypervisor may expose one or more logical volumes to the virtual machine instances. The logical volumes may be implemented by one or more data storage servers using one or more block-level storage devices. The data storage servers implementing the logical volumes may be distributed over various geographical regions. Furthermore, the logical volume may be duplicated on a plurality of the data storage servers. The service provider may ensure that the duplicate volume contains the same information and when customers modify the logical volume the modifications are reflected in each duplicate logical volume.

BRIEF DESCRIPTION OF THE DRAWINGS

Various embodiments in accordance with the present disclosure will be described with reference to the drawings, in which.

DETAILED DESCRIPTION

Figure 1:
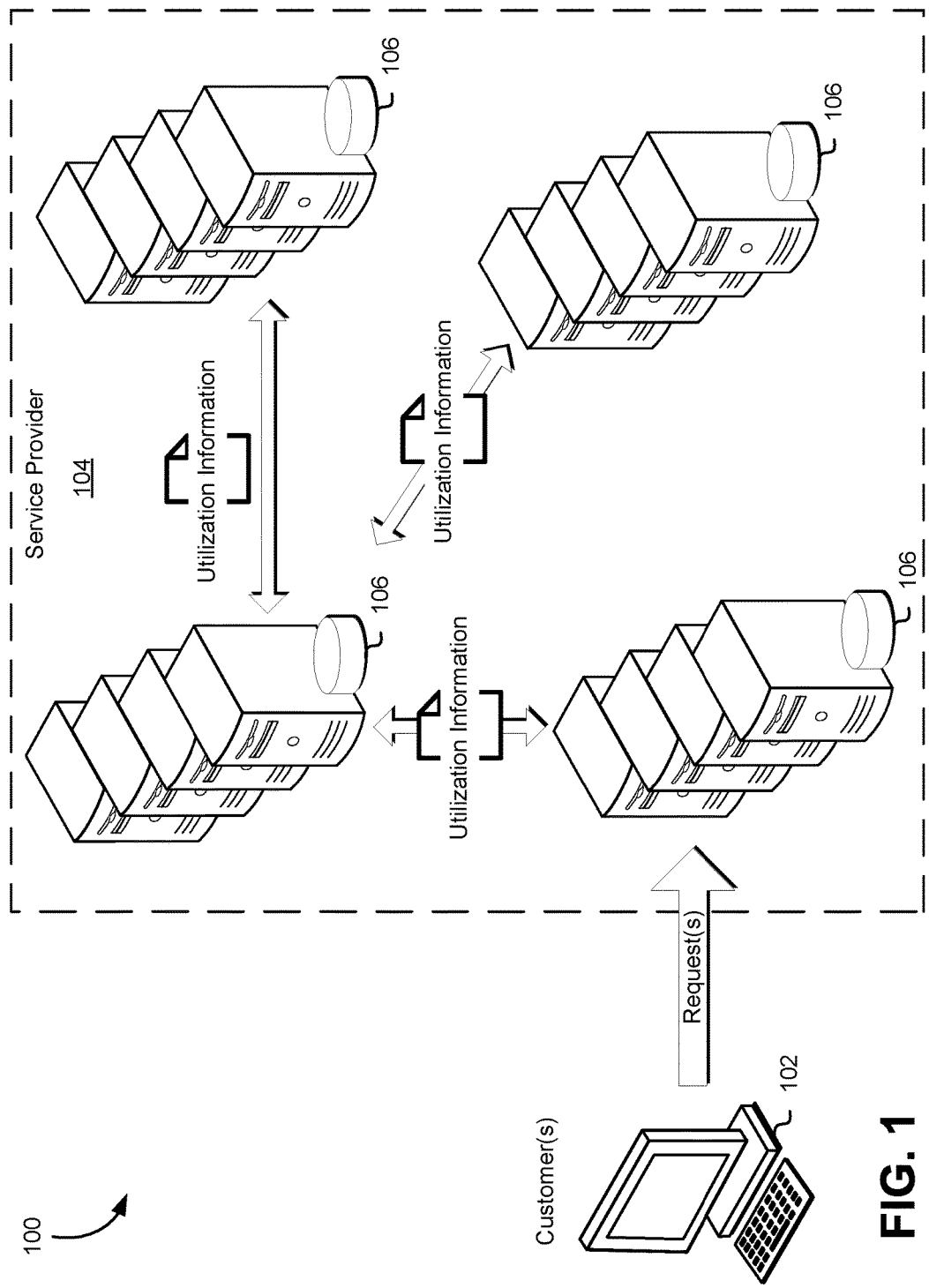
FIG. 1 illustrates an environment in which server utilization information may be distributed with a service provider in accordance with at least one embodiment.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Techniques described and suggested relate to enhancements for block allocation of data in data storage systems including distributed data storage systems operated by a service provider. The enhancements described herein may ensure well distributed load in the data storage systems. This enables the data storage systems to achieve high utilization while mitigating the occurrence of performance degradation caused by high resource utilization of data storage servers of the data storage system. For example, the service provider may provide a data storage service which enables customers to store data on data storage servers of a data storage system operated by the service provider. The data storage system may include a plurality of replicated state machines, where the plurality of replicated state machines may be a pool of blocks that contain customer data and internal metadata. In some embodiments, the number of blocks a particular replicated state machine contains is fixed, and blocks are allocated and deallocated based on customer workloads. For example, when a new block is required, the data storage system determines a particular replicated state machine to allocate the new block to. In determining the particular replicated state machine to allocate the new block to, the data storage may measure utilization of resources that support the plurality of replicated state machines and determine the particular replicated state machine based on the measure utilization of resources. For example, the data storage system may determine that the particular replicated state machine has the lowest utilization rate of the plurality of replicated state machines hosted by the data storage system, and allocate the new block to the particular replicated state machine. Utilization information of the data storage server of the data storage system may be collected and aggregated in order to measure the utilization rate of the plurality of replicated state machines and the data storage servers of the data storage system.

The replicated state machines may provide fault tolerance through redundancy by replicating data across multiple data storage servers of the data storage system. The multiple replicas of a particular replicated state machine (referred to herein as replicated state machine-shards) may each be located on a different data storage server of the data storage system, and each data storage server may host many replicated state machine-shards. For example, a particular replicated state machine may comprise 10 replicated state machine-shards, and a particular data storage server may host 10,000 replicated state machine-shards from 1,000 different replicated state machines. The allocation of new blocks to replicated state machines may increase the resource demands of the particular replicated state machine the new block is allocated to, and consequently the resource demands of all data storage servers that hold replicated state machine-shards corresponding to the particular replicated state machine to which the new block was allocated. Determining which replicated state machine to allocate the new block to base on a utilization rate reduces the probability of over-utilization and degradation of resources that support the replicated state machine-shards, such as the data storage servers.

The data storage system may measure resource utilization at the level of the replicated state machines to determine a utilization rate. In some embodiments, the replicated state machine aggregates resource metrics for each replicated state machine-shard. The resource metrics for each replicated state machine-shard may indicate resource utilization of the data storage server hosting the replicated state machine-shard. The metrics may include disk utilization, disk bandwidth, processing power, and network usage associated with the replicated state machine-shard. A consensus protocol, such as Paxos or chain replication, may be modified to include the resource metrics in messages transmitted between the data storage servers. For example, a message between two data storage servers to coordinate the replicated state machine-shards may include resource metrics corresponding to the data storage server and the replicated state machine-shard. The resource metrics may then be aggregated and a utilization rate may be determined based on the aggregated resource metrics. In some embodiments, the maximum resource utilization across all shards of a replicated state machine is calculated using resource metrics included in the consensus protocol messages. The resource metrics or utilization rate calculated from the resource metric may be used as an input by the data storage system in determining block allocation.

In some embodiments, a customer sends a block allocation request to a single data storage server of the data storage system. The data storage system server maintains a set of replicated state machine-shards, and as described above, each replicated state machine-shard maintains a resource utilization rate for all related replicated state machine-shards maintained by another data storage server of the data storage system. The data storage server may then determine a particular replicated state machine to allocate the block in response to the customer request. For example, the data storage server may inspect a random subset of local replicated state machine-shards and select a replicated state machine that minimizes the maximum utilization of all resources in the sampled set of local replicated state machine-shards. This method is applicable to distributed system architectures that manage resources at the level of replication groups, where replicas may require computing resources such as processor, network, memory, and storage of a host computer system.

FIG. 1 illustrates an example environment 100 where one or more computer systems executing in a service provider environment, as well as the associated code running thereon, may provide a storage service to customers 102 of a service provider 104. The storage service may include one or more data storage servers 106. The one or more data storage servers 106 may include one or more storage devices not illustrated in FIG. 1 for simplicity. Furthermore, the one or more data storage servers 106 may be components of the data storage service operated by the service provider 104. The data storage servers may include any suitable storage device such as hard disk drives, solid-state drives, network storage devices, RAM, floppy disk drives, optical disk drives, tape drives, or any other device suitable for storing data. The one or more data storage servers 106 may store data on behalf of the customer 102 and may also provide data to the customer 102 and/or one or more other customers. For example, the one or more data storage servers 106 may provide data for a website operated by the customer 102 using one or more other resources of the service provider. The data may be stored in a logical volume managed by the data storage service and stored across one or more data storage servers 106. Furthermore, the logical volumes may be configured such that a single logical volume may be accessible by multiple customers. For example, the logical volume may be a file system with shared access by a set of customers capable of simultaneous reading, writing, and modifying data stored in the file system.

The data storage servers 106 may host or otherwise maintain a set of replicated state machine-shards. The replicated state machine-shards may correspond to a replicated state machine hosted by a plurality of data storage servers 106. A particular replicated state machine may store data contained in a particular logical volume accessible by customers 102 of the service provider. In some embodiments, the replicated state machines contain a certain number of blocks with each block being a certain size. For example, a replicated state machine may contain 1,000 blocks and each block may be capable of holding 4 megabytes of data. Customers 102 may transmit requests to the service provider to store data, the customer data may be stored in a block of a particular replicated state machine. The customers 102 may be organizations or other entities. Furthermore, customers 102 may also include client applications or other applications configured to perform various operations on behalf of organizations or other entities. For example, an organization may provide employees with access to a computer system, the computer system may be configured with a client application configured to store data generated by the computer system with the service provider 104.

In some embodiments, the replicated state machine is a fault-tolerant service or computer system or set of computer systems. The replicated state machines may be configured to replicate the replicated state machine across multiple servers or computer systems, coordinate customer interactions with replicated state machines between servers, and maintain replicas of the replicated state machine. The coordination between servers maintaining replicas of the replicated state machine may be performed using one or more replication management protocols, such as a consensus protocol. A replicated state machine may begin at a particular state labeled start, each input to the replicate state machine received, such as customer block allocation, may be passed through the transition and output functions to produce a new state and an output. For example, the input may be customer data to be written to a block of data. The transition function may be responsible for writing the data to the block while the output function may be responsible for determining the state of the replicated state machine as a result of writing the data to the block. The new state may be held stable until a new input is received, while the output is communicated to the appropriate receiver such as the other servers containing replicas of the replicated state machine.

The consensus protocol may require agreement among a number of processes (e.g., replicated state machine-shards) for a single data value (e.g., a block of data). The processes may provide candidate values, communicate with other processes, and agree on a single consensus value. For example, a consensus protocol may require the processes to agree on a majority value in order to achieve consensus. For n processes, a majority value may require at least n/2+1 votes to win. The consensus protocol may be configured to account for certain numbers of faulty processes. The consensus protocol may include a number of requirements to achieve consensus among the processes. For example, a requirement of the consensus protocol may include that an output generated by a process must depend at least in part on an input of a process. In another example, the output of a process is required to be irrevocable. The consensus protocol may enable the processes to reach an agreement on an output that is the same value across all processes. For example, the consensus protocol may enable the replicated state machine-shards of a particular replicated state machine to agree on the value of a particular block of data hosted by the particular replicated state machine.

The data storage servers 106 may store data on behalf of the customers 102. Customer data stored in blocks of the replicated state machines may be replicated on a set of data storage servers 106. The customer data contained in the replicated state machine may be replicated on the set of data storage servers 106 using erasure encodings or other mechanism for reducing the amount of data written to any one data storage server 106 of the set of data storage servers 106. A consensus protocol as described above may be used to maintain the data in the replicated state machines. For example, when a particular replicated state machine changes state, the data storage server 106 hosting the replicated state machine which changed state may generate a consensus message configured to cause the replicated state machine-shards to determine a state change suitable for agreeing on one result (e.g., one state of the replicated state machine) among the group of replicated state machine-shards. The consensus protocol may cause the data storage servers 106 hosting the replicated state machine to transmit consensus messages to the set of data storage servers 106 participating in the same replicated state machines. For example, a particular data storage server 106 may participate in a set of replicated state machines, the set of replicated state machines may be replicated among any number of other data storage servers 106. When a particular replicated state machine in the set of replicated state machines changes state, the particular data storage server 106 may transmit a consensus message to the other data storage servers 106 hosting the particular replicated state machine.

In addition to the information corresponding to the state of the replicated state machine, the data storage server 106 may include the data storage server's resource utilization information. In various embodiments, the resource utilization information is a percentage of the data storage server's computing resources utilized by the set of replicated state machines hosted by the data storage server 106. For example, the data storage server may include the percentage of total disk capacity of the data storage server 106 currently utilized by the replicated state machines hosted by the data storage server 106 in the consensus message. The consensus message may include a variety of different resource metrics including disk bandwidth, disk capacity, network bandwidth, network capacity, processor capacity, processor utilization, memory utilization, latency, or any other resource information suitable as an input in determining a particular replicated state machine to allocate a block of data. In various embodiments, the consensus messages are transmitted 1 to 300 times a second, enabling the data storage servers 106 to determine instantaneous or near instantaneous recourse utilization of the replicated state machines.

The data storage servers may receive the consensus messages and obtain the resource metrics from the consensus messages. Furthermore, the data storage servers 106 may update a utilization rate for one or more of the replicated state machines hosted by the data storage server based at least in part on the resource metrics obtained from the consensus messages. For example, the data storage server 106 may be configured to calculate a utilization rate by multiplying disk capacity information included in the consensus messages by a constant. When a new consensus message is received the data storage server 106 may multiply the disk capacity metric included in the consensus message by the constant and add the value of the utilization rate for the replicated state machine associated with the consensus message. Various other means of calculating a utilization rate based at least in part on information contained in the consensus message may be used in accordance with the present disclosure.

When customers 102 or client applications operated by the customers 102 transmit a request for block allocation, the data storage server 106 receiving the request may select the replicated state machine with at least one free block and the lowest utilization rate. Various other selection criteria may be used when determining a replicated state machine to allocate a customer block. For example, the size of the block or amount of data the customer is attempting to allocate may alter the determination of which replicated state machine to allocate the customer's block to. Additionally, the customers 102 may request block allocation from a plurality of data storage servers 106, and the data storage servers 106 may return, in response to the request, one or more candidate replicated state machines hosted by the respective data storage servers 106. The customer 102 may then select one of the candidate replicated state machines to store the customer's 102 data. In some embodiments, the response may include the utilization rate of the one or more candidates replicated state machines or order the one or more candidate replicated state machines based at least on part on utilization rate.

Figure 2:
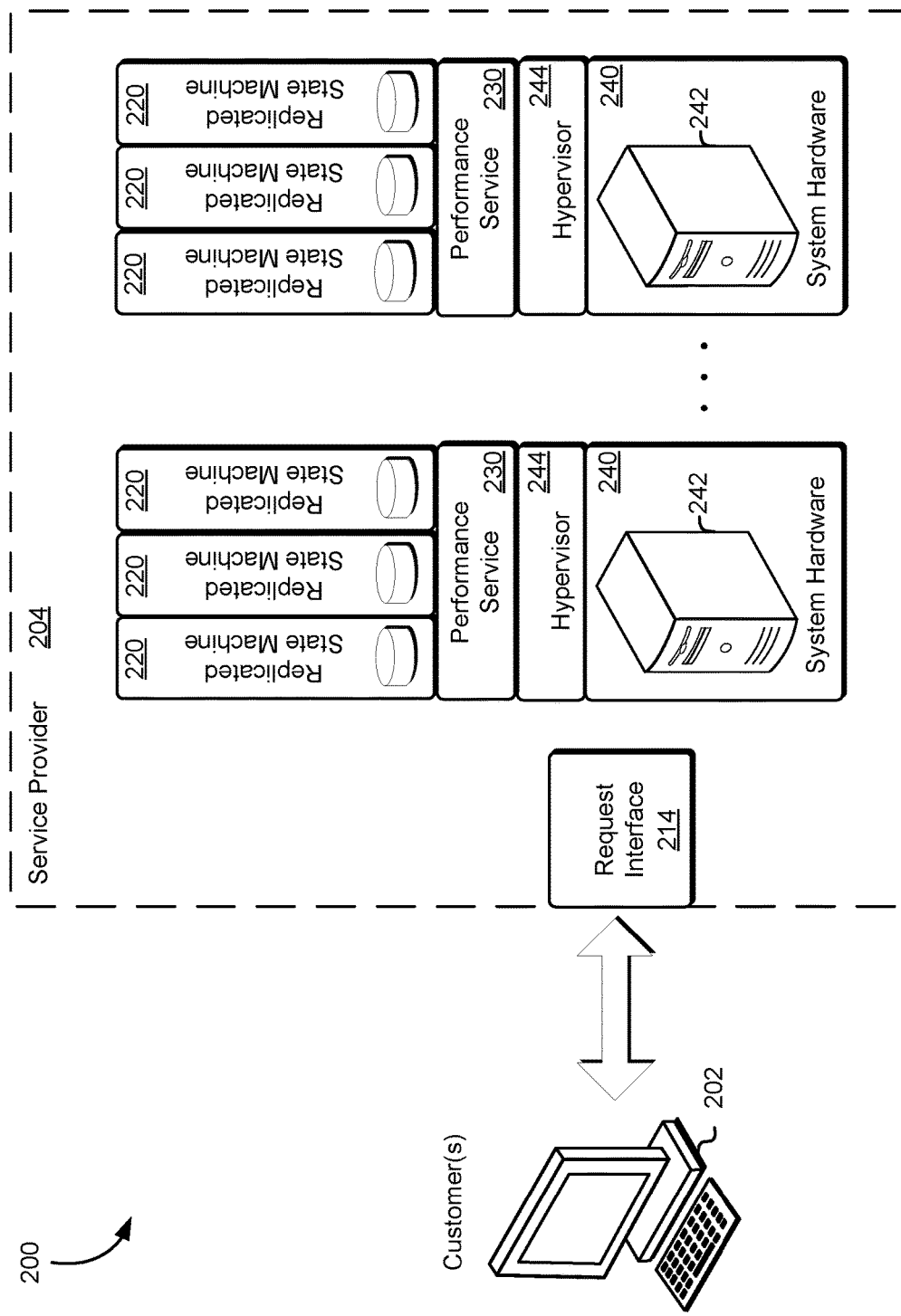
FIG. 2 illustrates an environment in which customers may interact with a replicated state machine in accordance with at least one embodiment.

FIG. 2 illustrates an environment 200 in which a data storage service executing a plurality of replicated state machines 220 may provide logical volumes, managed by the data storage service, to customers 202 in accordance with at least one embodiment. The data storage service, which may be system hardware 240, is used by a service provider 204 to provide logical volumes and other storage resources for customers 202. The service provider 204 may include website operators, online retailers, social network providers, cable providers, online game providers, or any entity capable of receiving customer data for storage. The system hardware 240 may include physical hosts 242 also referred to as host computer systems. The physical hosts 242 may be any device or equipment configured to execute instructions for performing data computation, manipulation, or storage tasks, such as a computer or a server. A physical host 242 may be equipped with any needed processing capability including one or more processors, such as a central processing unit (CPU), memory management unit (MMU), a graphics processing unit (GPU), or a digital signal processor (DSP), memory, including static and dynamic memory, buses and input and output ports that are compliant with any handshaking, communications, or data transfer protocol. The system hardware 240 may also include storage devices, such as storage disks and tapes, networking equipment and the like. The storage devices may be executed by network storage devices managed by the data storage service.

A virtualization layer executing on the physical host 242 enables the system hardware 240 to be used to provide computational resources upon which one or more replicated state machine 220 and performance services 230 may operate. For example, the virtualization layer may enable the performance service 230 to access system hardware 240 on the physical host 242 through device drivers on the hypervisor 244. Furthermore, the physical host 242 may host multiple hypervisors of the same or different types on the same system hardware 240. The hypervisor 244 may be any device, software, or firmware used for providing a virtual computing platform for the replicated state machines 220 and performance service 230. The virtual computing platform may include various virtual computer components, such as one or more virtual CPUs, virtual memory management units, virtual memory, and the like. The replicated state machines 220 may be used by the service provider 204 to store data contained in logical volumes exposed to the customer 202. One replicated state machine 220 may contain data of a single logical volume. The replicated state machine 220 may comprise multiple replicated state machine-shards distributed over multiple physical hosts as described in greater detail below.

Further, the service provider 204 may use one or more of virtual machines for executing applications, such as the performance service 230. Furthermore, performance service 230 may monitor consensus messages received at the replicated state machines 220 or intended for the replicated state machines 220 in order to obtain resource metrics or other utilization information included in the consensus messages.

The performance service 230 may monitor consensus messages associated with the replicated state machines 220 and/or utilization of the physical hosts 242 in order to determine a particular replicated state machine 220 to allocate a customer block. Furthermore, the performance service 230 may include utilization information of the particular physical host 242 executing the performance service 230 in consensus messages transmitted by the replicated state machines 220 executed by the particular physical host 242. The performance service 230 may also maintain a history of the resource utilization of the replicated state machines 220 associated with the performance service 230. As illustrated in FIG. 2, a physical host 242 may execute a performance service 230. The performance service 230 may be responsible for a plurality of replicated state machines 220 executed by the physical host 242. The performance service 230 may be configured to allocate or deallocate blocks to the replicated state machine. For example, as described above, a customer may request a block of data to be stored by the data storage service and the performance service 230 may determine a particular replicated state machine 220 suitable for block allocation.

Requests may be received by a request interface 214 operated by the service provider 204. The request interface 214 may direct the request to the appropriate system, such as performance service 230. In some embodiments, the request interface 214 may direct the request to multiple performance service 230. For example, the request interface 214 may transmit duplicate requests to a set of performance services 230 and return to the customer 202 a list of replicated state machines 220 suitable for block allocation. Once the performance service 230 receives a request, the performance service 230 may determine one or more replicated state machines 220 suitable for block allocation. In various embodiments, the replicated state machines 220 are configured to maintain utilization information corresponding to the amount of computing resources available to the replicated state machine 220. For example, the performance service 230 or other component of the service provider 204 may, in response to a request, query a set of replicated state machines 220 for utilization information. The replicated state machines 220 may provide the requested utilization information, the performance service 230, or other component of the service provider 204 may then determine at least one replicated state machine 220 of the set of queried replicated state machines 220 suitable for block allocation.

Returning to FIG. 2, the performance service 230 may calculate a utilization rate of the replicated state machines associated with the performance service 230. For example, the performance service may obtain disk capacity and network bandwidth information associated with a particular physical host 242 in a consensus message from a particular replicated state machine-shard hosted by the particular physical host 242, described in greater detail below in connection with FIG. 3. The performance service 230 may then determine a utilization rate of the replicated state machine corresponding to the particular replicated state machine-shard by at least multiplying the obtained disk capacity information by a constant and the obtained network bandwidth information by another constant. The constants may be selected such that by multiplying the utilization information by the particular constant establish a bias or skew towards a particular measure. For example, by multiplying the disk capacity information by the constant 0.8 and the bandwidth information by the constant 0.5 the utilization rate may be skewed towards disk capacity information. In various embodiments, the calculated utilization rate is added to or multiplied with a historical utilization rate based at least in part on one or more previous consensus messages. Furthermore, the utilization rate may be configured to decay over time or otherwise discount or give less weight to historical utilization information.

Figure 3:
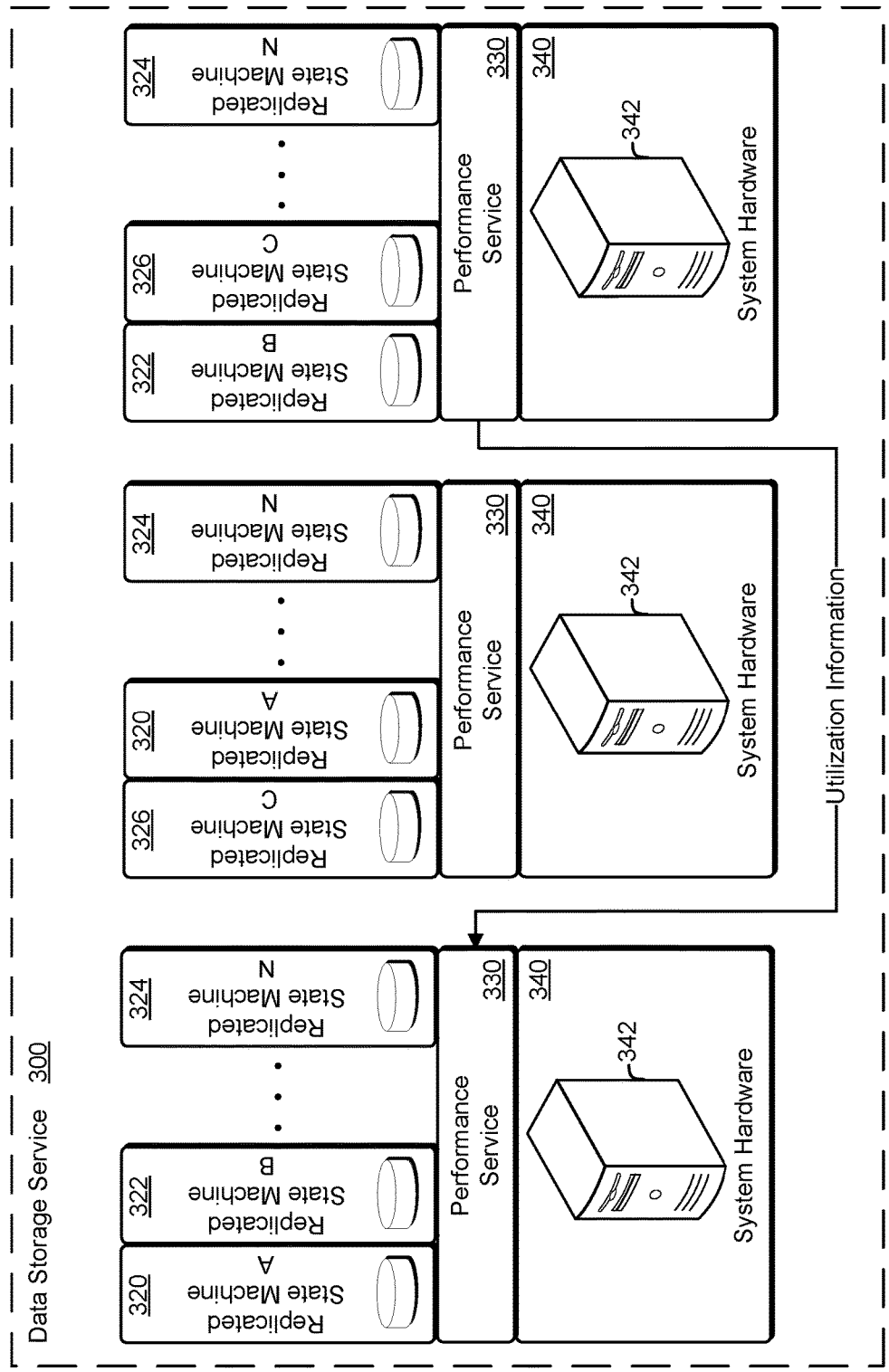
FIG. 3 illustrates an environment in which server utilization information may be distributed with a service provider in accordance with at least one embodiment.

FIG. 3 illustrates a data storage service 300 executing a plurality of replicated state machines configured to provide utilization information in accordance with at least one embodiment. As described above in FIG. 2, the replicated state machines may be supported by system hardware 340. The system hardware 340 may include physical hosts 342 also referred to as a host computer system as described above. The physical host 342 may host a replicated state machine-shard such as replicated state machine A 320 as illustrated in FIG. 3. Each replicated state machine (e.g., replicated state machine N 324 and replicated state machine C 326) may track the state of a collection of blocks assigned to the replicated state machine during deployment. The collection of blocks corresponds to a set of blocks of a storage device, such as a block-level storage device. The storage device may be connected to the physical host 342.

As illustrated in FIG. 3, replicated state machine B 322 may comprise a set of replicated state machine-shards hosted by a set of physical hosts 342. When allocation of a block occurs, as described above, a state change operation may be performed by the replicated state machine where the block allocation occurred. For example, assigning a block to a particular customer or writing customer data to a block may cause the replicated state machine to perform a state change operation. In addition, the replicated state machine may cause a consensus message to be transmitted to a set of physical hosts 342 hosting corresponding replicated state machine shards. In various embodiments, the performance service 330 may obtain the consensus message from the replicated state machine and insert utilization information of the physical host 342. In yet other embodiments, the performance service 330 generates the consensus message, including the utilization information, on behalf of the replicated state machine.

For example, as illustrated in FIG. 3, replicated state machine B 322 may perform a state change operation, and as a result performance service 330 may generate a consensus message and include physical host metrics. The performance service 330 may then determine the set of the other physical hosts' 342 participation in the replicated state machine B 322 and transmit the consensus message to the set of other physical hosts 342 participating in the replicated state machine B 322. The consensus message, once received, may cause the replicated state machine B 322 to synchronize state information. Furthermore, the performance service 330 or other component of the physical host, such as the replicated state machine, may obtain the utilization information from the consensus message. The utilization information may be stored for an interval of time or may be used to calculate and/or update a utilization rate of the replicated state machine. In some embodiments, the utilization rate of the replicated state machine is approximated based at least in part on utilization information of the physical hosts 342 participating in the replicated state machine.

Figure 4:
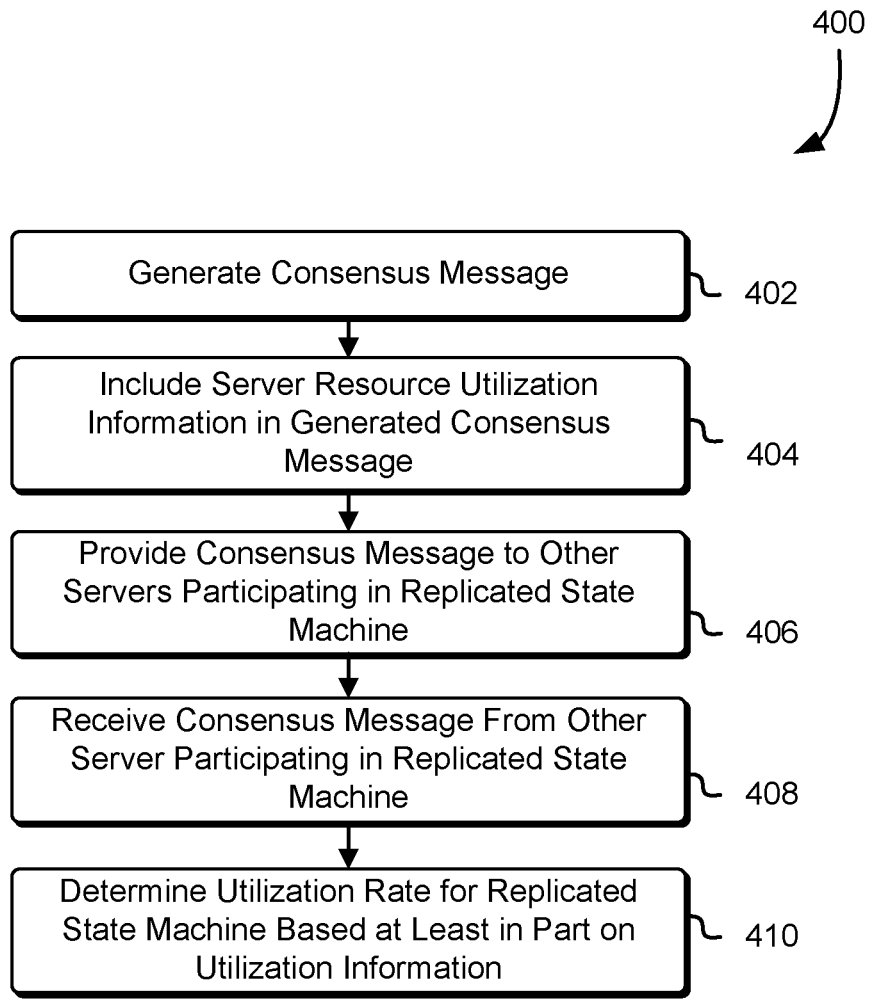
FIG. 4 illustrates a process for determining a utilization rate for a data storage server in accordance with at least one embodiment.

FIG. 4 shows an illustrative example of process 400 which may be used to determine a utilization rate for a data storage server. The process 400 may be performed by any suitable system such as the performance service 230 and replicated state machine 220 described above in connection with FIG. 2. Returning to FIG. 4, in an embodiment, the process 400 includes generating a consensus message 402. The consensus message may be generated by a computer system supporting a replicated state machine as described above. Furthermore, the consensus message may be generated as a result of a change of state of the replicated state machine. Server resource utilization information may then be included in the generated consensus message. The server may include a physical host supporting the replicated state machine. In some embodiments, the performance service may query the server to determine resource utilization information and provide the resource utilization information to the replicated state machine or include the resource utilization information in the consensus message generated by the replicated state machine. The resource utilization information may include any information about the computing resources of the server suitable for determining a utilization rate of the replicated state machine. As described above, the resource utilization information may include disk capacity, network bandwidth, disk bandwidth, temperature of the server or components thereof, memory capacity, and processing throughput.

In numerous variations to process 400, the replicated state machine may then generate a consensus message including the determined resource utilization information as a result of a change in state of the replicated state machine. In yet other variations to process 400, the performance service generates the consensus message and includes the determined resource utilization information 404. Returning to FIG. 4, the replicated state machine may then provide the consensus message to other servers participating in the replicated state machine 406. As illustrated above in FIGS. 2 and 3, a replicated state machine may comprise multiple replicated state machine-shards hosted by multiple servers. The replicated state machines may use consensus messages to maintain the same state across the plurality of shards of the replicated state machine. Furthermore, these consensus messages may include resource utilization information in order to determine the replicated state machine's utilization when allocating blocks to replicated state machines.

The server and replicated state machine may also receive consensus messages from other servers participating in the replicated state machine 408. The received consensus messages may include resource utilization information from the other server participating in the replicated state machine. For example, if the replicated state machine comprises 10 replicated state machine-shards each on a separate server, any particular replicated state machine-shard of the 10 replicated state machine-shards may receive at least one consensus message including resource utilization of the server from every other replicated state machine-shard. The replicated state machine or, in some embodiments, the performance service, may determine a utilization rate for the replicated state machine based at least in part on the resource utilization information 410. In various embodiments, the utilization rate is an aggregate of the resource utilization information obtained from the consensus messages. In yet other embodiments, the utilization rate may be the output of a function which accepts the resource utilization information as an input.

Figure 5:
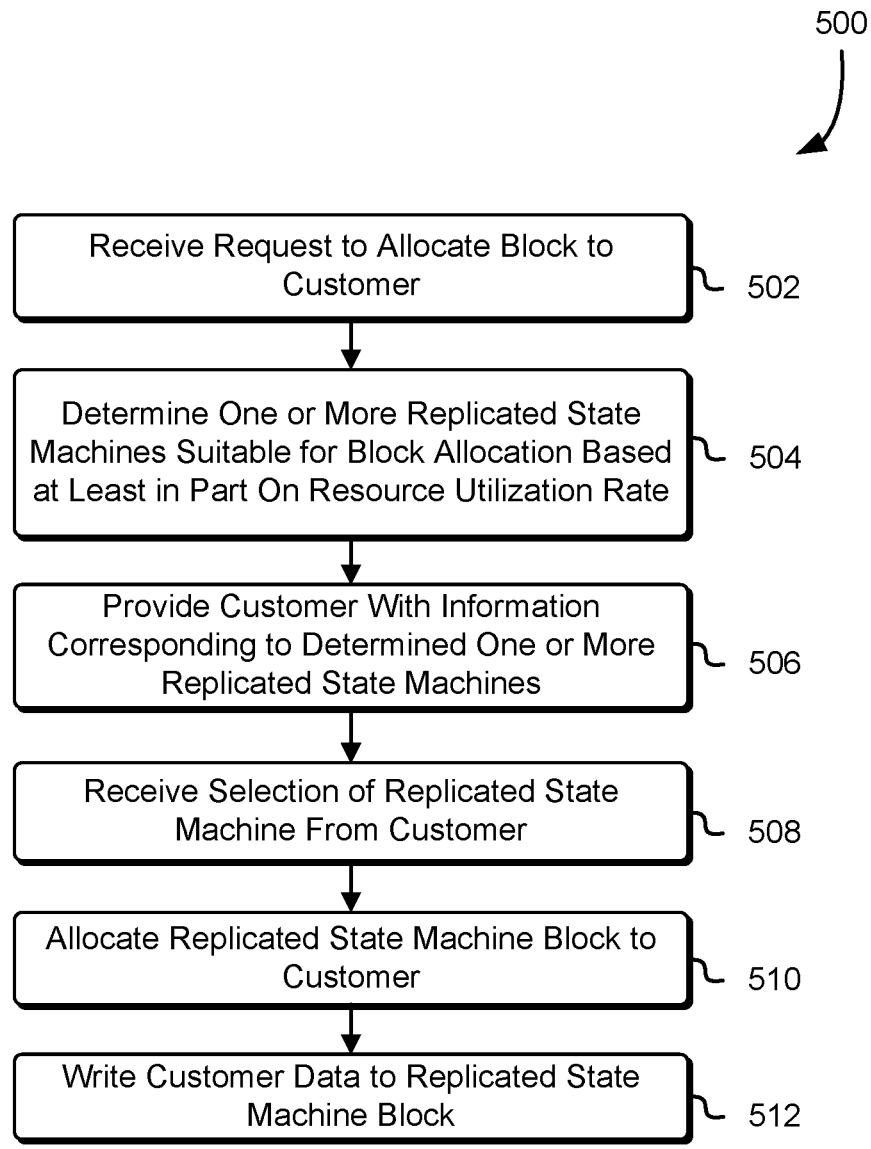
FIG. 5 illustrates a process for allocation of a block of a replicated state machine to a customer in accordance with at least one embodiment.

FIG. 5 shows an illustrative example of process 500 which may be used to determine a utilization rate for a data storage server. The process 500 may be performed by any suitable system such as the performance service 230 and replicated state machine 220 described above in connection with FIG. 2. Returning to FIG. 5, in an embodiment, the process 500 includes receiving a request to allocate a block to a customer 502. As described above, customers may transmit requests to the service provider requesting allocation of a block in order to store customer data in the allocated block. In various embodiments, the customer or client application of the customer may transmit a plurality of requests in parallel in order to receive a set of replicated state machines suitable for block allocation.

The customer may include another service or computer system of the computing resource service provider. For example, the customer may include a virtual computer system service configured to store data using one or more data storage servers. The customer may also include a client application operated by the customer. The client application may be configured to receive an input from the customer through an input device connected to a computer system operated by the customer and perform various operations in response to receiving customer input. For example, the customer, using an interface of the client application, request a file to be stored by the data storage service, the client application may generate a request to allocate a block to the customer capable of storing the file. Once the request is received, the performance server may determine one or more replicated state machines suitable for block allocation based at least in part on the utilization rate 504. For example, the performance service may query a random set of replicated state machines hosted by the server to determine the utilization rate.

The performance service may then provide the customer with information corresponding to the determined one or more replicated state machines suitable for block allocation. In some embodiments, the information includes a list of replicated state machines suitable for block allocation from which the customer may select a particular replicated state machine to host the customer's block of data. The list of replicated state machines suitable for block allocation may include the utilization rate calculated for each replicated state machine. In a variation to process 500, the performance service may allocate a block to the customer based at least in part on the determined utilization rate, and the information provided to the customer includes the particular replicated state machine containing the block allocated to the customer 506. Returning to FIG. 5, the performance service or other component of the server may receive the customer's selection of a particular replicated state machine for allocation of the customer's block 508. As described above, the customer may be the client application executed by a computer system operated by the customer. In various embodiments, the client application is responsible for selecting a particular replicated state machine to store the block of customer data. For example, the client application may receive a request from the customer through an input device of the computer system and, as a result, interact with the data storage service in order to store customer data in a particular replicated state machine selected by the client application based at least in part on the calculate utilization rate. Furthermore, the customer may also be a computer system or service of the service provider.

The customer may not select any of the replicated state machines provided to the customer. In some embodiments, this may terminate process 500 and no block may be allocated to the customer. In yet other embodiments, if the customer does not select a replicated state machine from the determined one or more replicated state machines, the performance service may query another random or pseudo-random set of replicated state machines and provide the customer with another set of replicated state machines suitable for block allocation. If the customer does select a replicated state machine from the set of replicated state machines provided to the customer, the server or component thereof, such as the performance service, may allocate a block from the selected replicated state machine to the customer 510. As a result of allocation of the block, the replicated state machine may generate a consensus message to indicate a state change to other than the replicated state machine-shards of the replicated state machine. Once allocated, customer data may be written to the block of the replicated state machine 512. This may also cause the replicated state machine to generate a consensus message as a result of data being written to a block of the replicated state machine.

Figure 6:
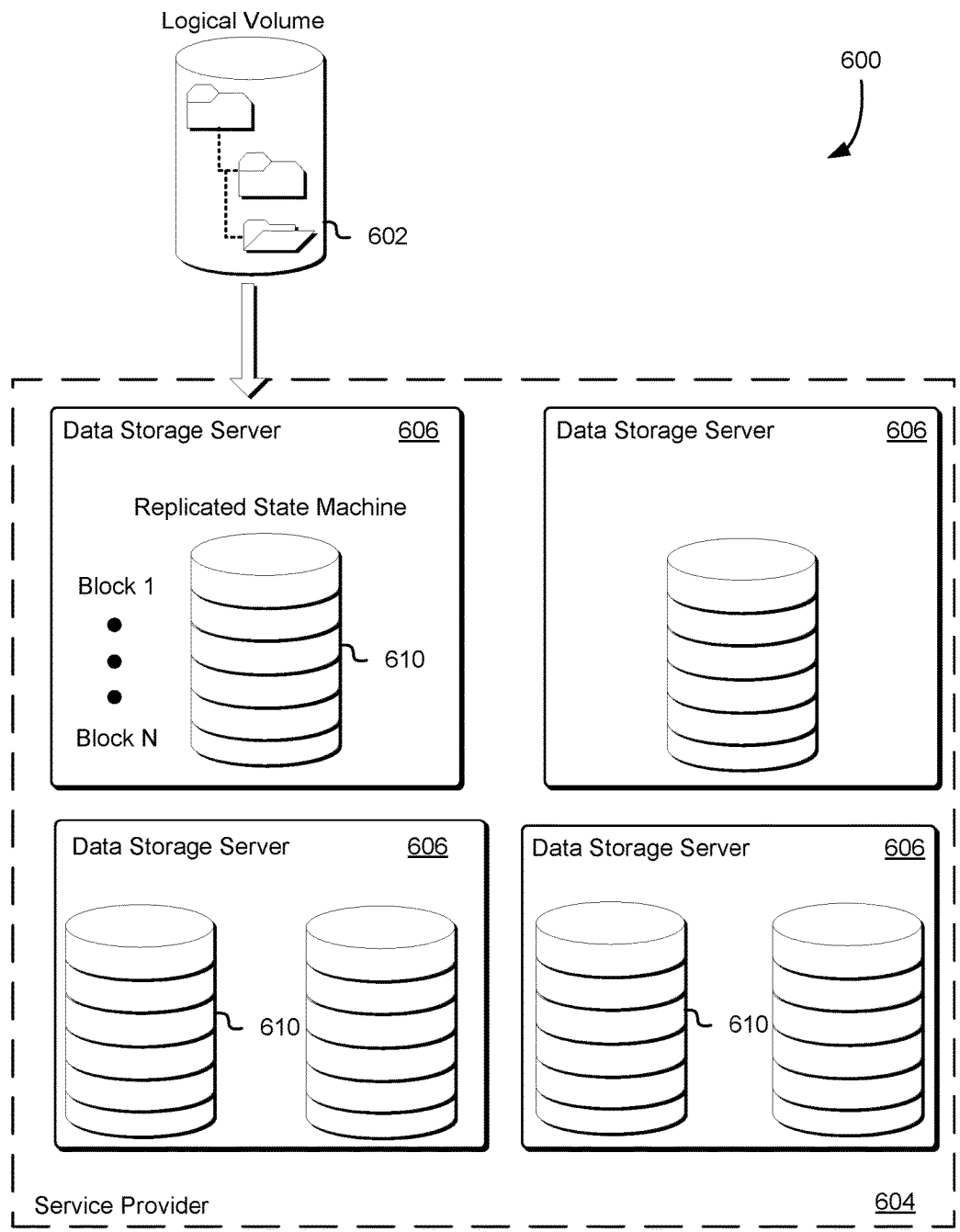
FIG. 6 illustrates an environment in which a logical volume may be stored with a data storage service in accordance with at least one embodiment.

FIG. 6 illustrates an example environment 600 where one or more computer systems, as well as the associated code running thereon, may provide customers with logical volumes 602 wherein the logical volume may be stored by a service provider 604 using a replicated state machine. Customer data may be stored across a variety of different data storage servers 606 containing one or more storage devices such as block-level storage devices. The customer data stored on the different devices may be exposed to a computer system operated by the customer as a logical volume 602. As described above, the customer may instantiate one or more virtual machines on computing resources of the service provider, and the one or more virtual machines may attach the exposed logical volume to enable the customer to interact with the logical volume. The logical volume 602 may contain one or more files which are simultaneously accessible to multiple computer systems operated by customers of the service provider.

Furthermore, the replicated state machines may be configured to store data in blocks and may be assigned a pool of blocks of the one or more block-level storage devices contained in the data storage server 606. For example, as illustrated in FIG. 6, replicated state machine 610 may contain a pool of blocks (block 1 through block N illustrated in FIG. 6) of a block-level storage device connected to the data storage server 606. In various embodiments, the pool of blocks may correspond to a pool of blocks on different block-level storage devices. For example, block 1 through block 200 of the replicated state machine may be on a first block level storage device and block 201 through block N may be on a second block-level storage device. Additionally, replicated state machine-shards may be hosted on other data storage servers of the service provider 604.

Figure 7:
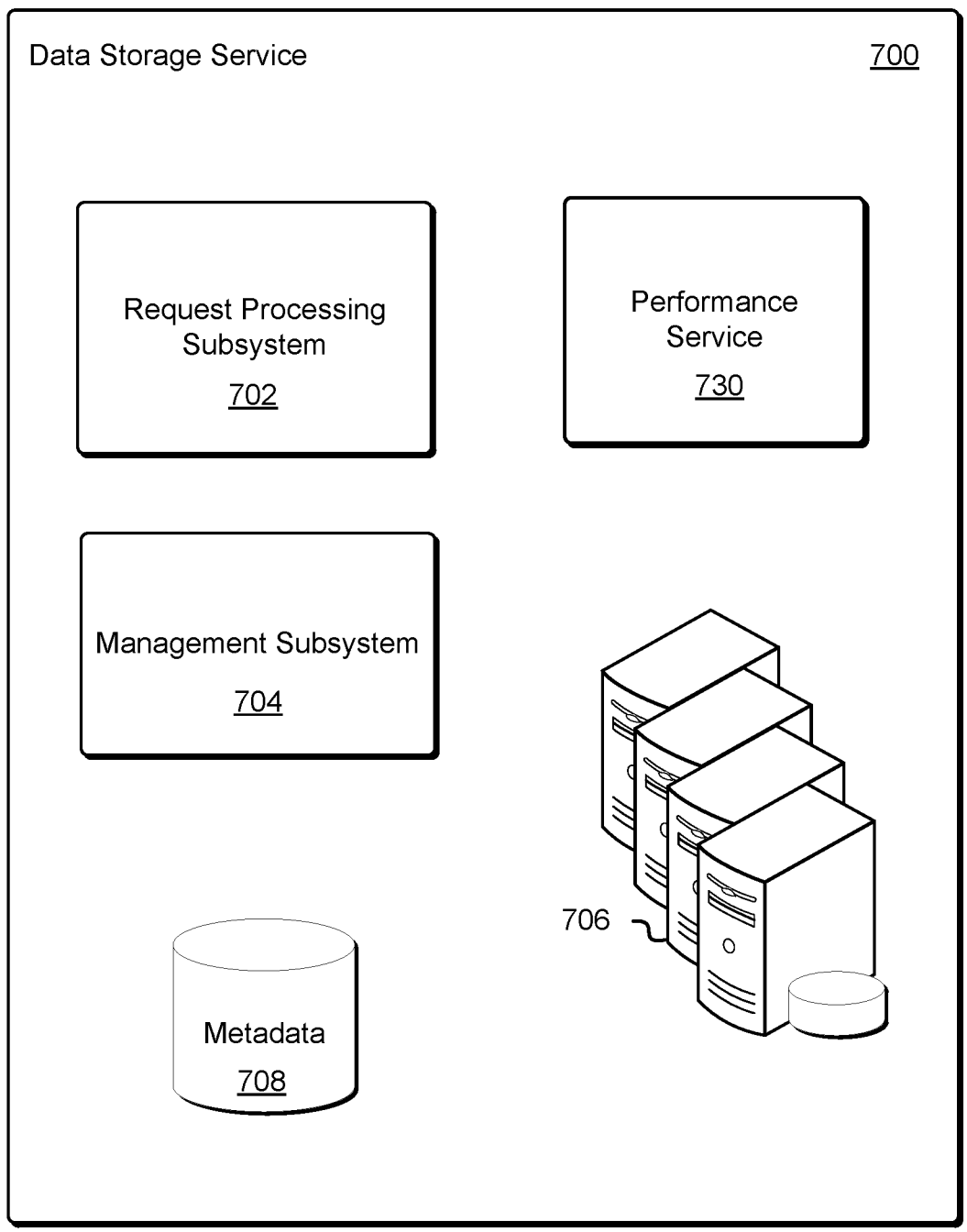
FIG. 7 illustrates a data storage service in accordance with at least one embodiment.

FIG. 7 shows an illustrative example of a data storage service in accordance with various embodiments. The data storage service 700 may be a service of a computing resource provider used to operate a data storage service wherein a logical volume provided by the storage service may be stored in a replicated state machine described above in connection with FIG. 1. As illustrated in FIG. 7, the data storage service 700 includes various subsystems such as a request processing subsystem 702 and a management subsystem 704. In some embodiments, the data storage service may also include a performance service 730. The performance service 730 may determine and/or calculate a utilization rate of the replicated state machines.

The data storage service 700 may also include a plurality of data storage servers 706 and a metadata storage 708, which may store metadata about various data objects and/or logical volumes stored among the data storage servers 706 as described herein. In an embodiment, the request processing subsystem 702 is a collection of computing resources, such as webservers and application servers, collectively configured to process requests submitted to the data storage service 700. The request processing subsystem 702, for example, may include one or more webservers that provide a web service interface to enable customers of the data storage service 700 to submit requests to be processed by the data storage service 700. For example, the customer may request allocation of a block of a replicated state machine. Furthermore, the request processing subsystem 702 may receive requests to interact with data stored by the one or more data storage servers 706 as a logical volume. The request processing subsystem 702 may include computer systems configured to make various determinations in connection with the processing of requests, such as whether policy allows fulfillment of a request, whether requests are authentic (e.g., electronically signed using a suitable cryptographic key) and otherwise.

Components of the request processing subsystem may interact with other components of the data storage service 700 (e.g., through network communications). For example, some requests submitted to the request processing subsystem 702 may involve the management of computing resources which may include data objects stored by the data storage servers 706. The request processing subsystem 702, for example, may receive and process requests to modify computing resources. For instance, in some examples, data objects are logically organized into logical volumes (also referred to as logical data containers). Data objects associated with a logical data container may, for example, be said to be in the logical data container. Requests to the data processing subsystem 702 may include requests for creating logical data containers, deleting logical data containers, providing an inventory of a logical data container, providing or updating access control policy with respect to one or more logical data containers and the like.

The requests may be processed by the management subsystem 704 upon receipt by the request processing subsystem 702. If applicable, various requests processed by the request processing subsystem 702 and/or management subsystem 704, may result in the management subsystem 704 updating metadata associated with data objects and logical data containers stored in the metadata store 708. Other requests that may be processed by the request processing subsystem 702 include requests to perform operations in connection with data objects. The requests, for example, may include requests to allocate one or more blocks to a customer, requests to upload data objects to the data storage service 700, to download data objects from the data storage service 700, to delete data objects stored by the data storage service 700, and/or other operations that may be performed.

Requests processed by the request processing subsystem 702 that involve operations on data objects (upload, download, delete, e.g.) may include interaction between the request processing subsystem 702 and one or more data storage servers 706. The data storage servers 706 may be computer systems communicatively coupled with one or more storage devices for the persistent storage of data objects. For example, in order to process a request to upload a data object, the request processing subsystem may transmit data to a data storage server 706 for persistent storage. It is noted, however, that in some embodiments, client (e.g., customer) computer systems may transmit data directly to the data storage servers 706 instead of through severs in the request processing subsystem.

In some embodiments, the request processing subsystem 702 transmits data to multiple data storage servers 706 for the purpose of redundantly storing the data to allow the retrievability of data in the event of failure of an individual data storage server 706 and/or associated data storage device. For example, in some embodiments, the request processing subsystem uses a redundancy in coding scheme such as erasure coding to deconstruct a data object into multiple parts that are stored among the data storage servers 706 and provide the deconstructed data objects to a replicated state machine hosted by the data storage servers 706. The parts may be configured such that if access to a certain number of parts is lost, the data object may nevertheless be reconstructable from the remaining parts that remain accessible.

To enable efficient transfer of data between the request processing subsystem 702 and the data storage servers 706 and/or generally to enable quick processing of requests, the request processing subsystem 702 may include one or more databases that enable the location of data among the data storage servers 706. For example, the request processing subsystem 702 may operate a key value store that serves to associate identifiers of data objects with locations among the data storage servers 706 for accessing data of the data objects. In an embodiment, the performance service 730 is a collection of computing resources, such as a virtual machine executed by a host computer system configured to monitor one or more replicated state machines and determine a utilization rate of the one or more replicated state machines. Although the performance service 730 is shown in FIG. 7 as a component of the data storage service 700, the performance service 730 may be implemented as a process of a hypervisor as illustrated in FIG. 2. The performance service 730 may retrieve information corresponding to the utilization of various computing resources of the data storage servers participating in a particular replicated state machine. The performance service 730 may then calculate a utilization rate of the particular replicated state machine based at least in part on the utilization of various computing resources of the data storage servers participating in a particular replicated state machine.

Figure 8:
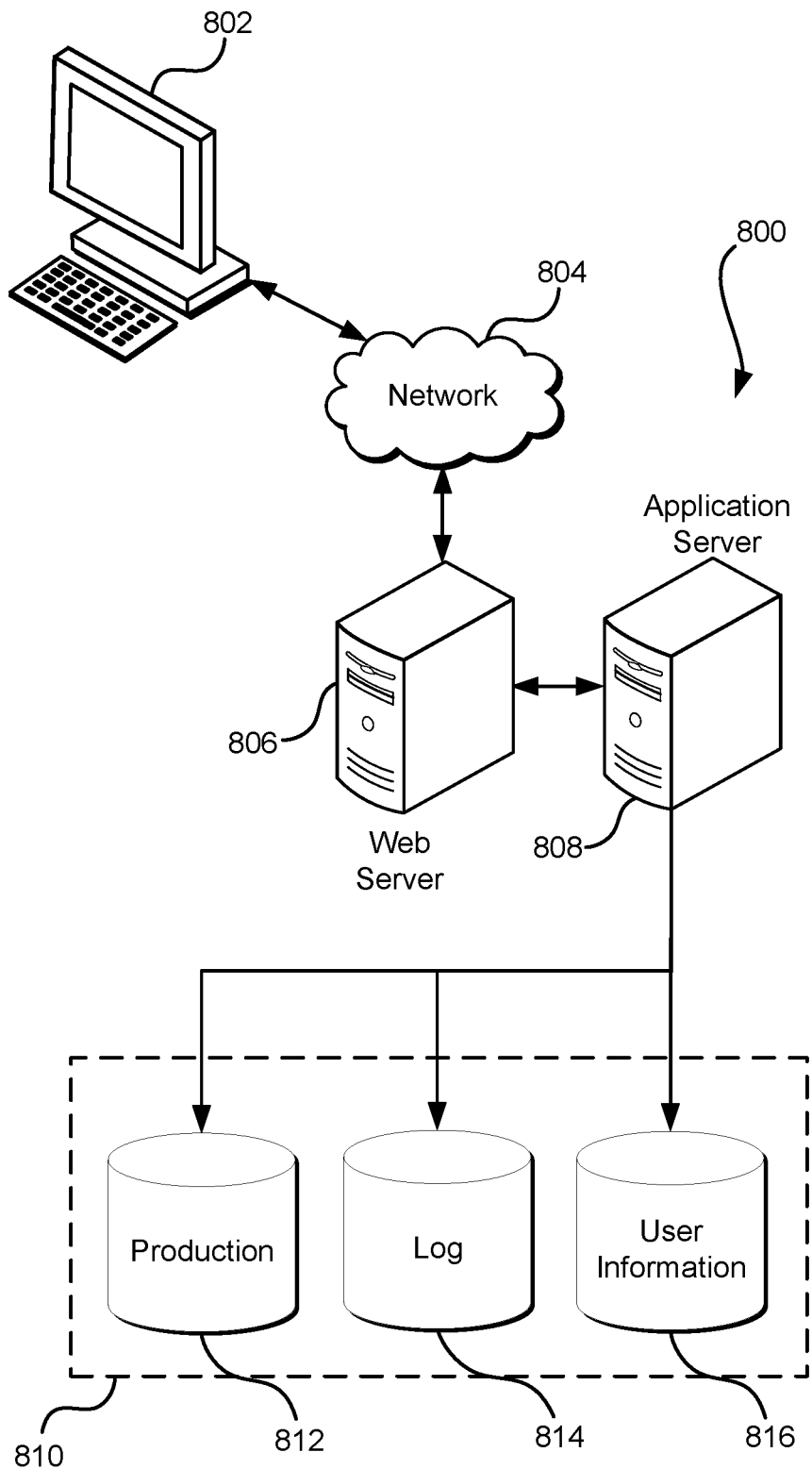
FIG. 8 illustrates an environment in which various embodiments can be implemented.

FIG. 8 illustrates aspects of an example environment 800 for implementing aspects in accordance with various embodiments. As will be appreciated, although a web-based environment is used for purposes of explanation, different environments may be used, as appropriate, to implement various embodiments. The environment includes an electronic client device 802, which can include any appropriate device operable to send and/or receive requests, messages or information over an appropriate network 804 and, in some embodiments, convey information back to a user of the device. Examples of such client devices include personal computers, cell phones, handheld messaging devices, laptop computers, tablet computers, set-top boxes, personal data assistants, embedded computer systems, electronic book readers and the like. The network can include any appropriate network, including an intranet, the Internet, a cellular network, a local area network, a satellite network or any other such network and/or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a web server 806 for receiving requests and serving content in response thereto, although for other networks an alternative device serving a similar purpose could be used as would be apparent to one of ordinary skill in the art.

The illustrative environment includes at least one application server 808 and a data store 810. It should be understood that there can be several application servers, layers or other elements, processes or components, which may be chained or otherwise configured, which can interact to perform tasks such as obtaining data from an appropriate data store. Servers, as used herein, may be implemented in various ways, such as hardware devices or virtual computer systems. In some contexts, servers may refer to a programming module being executed on a computer system. As used herein, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered environment. The application server can include any appropriate hardware, software and firmware for integrating with the data store as needed to execute aspects of one or more applications for the client device, handling some or all of the data access and business logic for an application. The application server may provide access control services in cooperation with the data store and is able to generate content including, but not limited to, text, graphics, audio, video and/or other content usable to be provided to the user, which may be served to the user by the web server in the form of HyperText Markup Language ("HTML"), Extensible Markup Language ("XML"), JavaScript, Cascading Style Sheets ("CSS") or another appropriate client-side structured language. Content transferred to a client device may be processed by the client device to provide the content in one or more forms including, but not limited to, forms that are perceptible to the user audibly, visually and/or through other senses including touch, taste, and/or smell. The handling of all requests and responses, as well as the delivery of content between the client device 802 and the application server 808, can be handled by the web server using PHP: Hypertext Preprocessor ("PHP"), Python, Ruby, Perl, Java, HTML, XML or another appropriate server-side structured language in this example. It should be understood that the web and application servers are not required and are merely example components, as structured code discussed herein can be executed on any appropriate device or host machine as discussed elsewhere herein. Further, operations described herein as being performed by a single device may, unless otherwise clear from context, be performed collectively by multiple devices, which may form a distributed and/or virtual system.

The data store 810 can include several separate data tables, databases, data documents, dynamic data storage schemes and/or other data storage mechanisms and media for storing data relating to a particular aspect of the present disclosure. For example, the data store illustrated may include mechanisms for storing production data 812 and user information 816, which can be used to serve content for the production side. The data store also is shown to include a mechanism for storing log data 814, which can be used for reporting, analysis or other such purposes. It should be understood that there can be many other aspects that may need to be stored in the data store, such as page image information and access rights information, which can be stored in any of the above listed mechanisms as appropriate or in additional mechanisms in the data store 810. The data store 810 is operable, through logic associated therewith, to receive instructions from the application server 808 and obtain, update or otherwise process data in response thereto. The application server 808 may provide static, dynamic or a combination of static and dynamic data in response to the received instructions. Dynamic data, such as data used in web logs (blogs), shopping applications, news services and other such applications may be generated by server-side structured languages as described herein or may be provided by a content management system ("CMS") operating on, or under the control of, the application server. In one example, a user, through a device operated by the user, might submit a search request for a certain type of item. In this case, the data store might access the user information to verify the identity of the user and can access the catalog detail information to obtain information about items of that type. The information then can be returned to the user, such as in a results listing on a web page that the user is able to view via a browser on the user device 802. Information for a particular item of interest can be viewed in a dedicated page or window of the browser. It should be noted, however, that embodiments of the present disclosure are not necessarily limited to the context of web pages, but may be more generally applicable to processing requests in general, where the requests are not necessarily requests for content.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment, in one embodiment, is a distributed and/or virtual computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 8. Thus, the depiction of the system 800 in FIG. 8 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop, laptop or tablet computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network. These devices also can include virtual devices such as virtual machines, hypervisors and other virtual devices capable of communicating via a network.

Various embodiments of the present disclosure utilize at least one network that would be familiar to those skilled in the art for supporting communications using any of a variety of commercially-available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS") and AppleTalk. The network can be, for example, a local area network, a wide-area network, a virtual private network, the Internet, an intranet, an extranet, a public switched telephone network, an infrared network, a wireless network, a satellite network and any combination thereof.

In embodiments utilizing a web server, the web server can run any of a variety of server or mid-tier applications, including Hypertext Transfer Protocol ("HTTP") servers, FTP servers, Common Gateway Interface ("CGI") servers, data servers, Java servers, Apache servers and business application servers. The server(s) also may be capable of executing programs or scripts in response to requests from user devices, such as by executing one or more web applications that may be implemented as one or more scripts or programs written in any programming language, such as Java®, C, C# or C++, or any scripting language, such as Ruby, PHP, Perl, Python or TCL, as well as combinations thereof. The server(s) may also include database servers, including without limitation those commercially available from Oracle®, Microsoft®, Sybase® and IBM® as well as open-source servers such as MySQL, Postgres, SQLite, MongoDB, and any other server capable of storing, retrieving and accessing structured or unstructured data. Database servers may include table-based servers, document-based servers, unstructured servers, relational servers, non-relational servers or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU" or "processor"), at least one input device (e.g., a mouse, keyboard, controller, touch screen or keypad) and at least one output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.) and working memory as described above. The computer-readable storage media reader can be connected with, or configured to receive, a computer-readable storage medium, representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as, but not limited to, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including" and "containing" are to be construed as open-ended terms (i.e., meaning "including, but not limited to,") unless otherwise noted. The term "connected," when unmodified and referring to physical connections, is to be construed as partly or wholly contained within, attached to or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal. Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications and patents, cited herein are hereby incorporated by reference to the same extent as if each reference were individually and specifically indicated to be incorporated by reference and were set forth in its entirety herein.

What is claimed is:

1. A computer-implemented method, comprising:
determining a state change of a replicated state machine comprising a set of shards;
generating a consensus message to enable the set of shards to establish a current state of the replicated state machine based at least in part on the state change;
inserting, into the consensus message, message utilization information associated with a first computer system of one or more computer systems participating in the replicated state machine;
providing the consensus message to a second computer system of the one or more computer systems participating in the replicated state machine; and
in response to receiving the consensus message, causing the second computer system to obtain, from the consensus message, utilization information determine a utilization rate for the first computer system based at least in part on the utilization information.

2. The computer-implemented method of claim 1, wherein the computer-implemented method further includes causing the second computer system to calculate a utilization rate of the replicated state machine based at least in part on additional utilization information obtained from additional consensus messages received from at least one other computer system of the one or more computer systems.

3. The computer-implemented method of claim 2, wherein the computer-implemented method further includes causing the second computer system to allocate a block of the replicated state machine to a customer based at least in part on the utilization rate of the replicated state machine.

4. The computer-implemented method of claim 2, wherein the second computer system causes the calculated utilization rate to decay at a rate over an interval of time.

5. The computer-implemented method of claim 1, wherein the computer-implemented method further includes:
obtaining a request from a customer to al locate a block to the customer;
determining a set of utilization rates associated with a set of replicated state machines of which the replicated state machine is a member; and
selecting a particular replicated state machine of the set of replicated state machines based at least in part on a particular utilization rate of the set of utilization rates associated with the particular replicated state machine.

6. The computer-implemented method of claim 5, wherein the computer-implemented method further includes transmitting a response to the customer indicating the block has been allocated to the particular replicated state machine.

7. The computer-implemented method of claim 6, wherein the computer-implemented method further includes:
allocating the block to the customer as a result of selecting the particular replicated state machine; and
generating another consensus message including utilization information associated with resource utilization of the computer system as a result of allocating the block to the customer.

8. A system, comprising:
one or more processors; and
memory that stores computer-executable instructions that, upon execution by the one or more processors, cause the system to:
generate a first consensus message to enable a set of shards to establish a current state of a replicated state machine based at least in part on a state change of the system;
determine first utilization information associated with the system to include in the first consensus message;
provide the first consensus message, including the utilization information, to at least one other system participating in the replicated state machine;
obtain second utilization information from a second consensus message from a second system hosting a shard of the set of shards; and
determine a utilization rate for the shard based at least in part on the second utilization information.

9. The system of claim 8, wherein the utilization information is selected from disk input output rate, disk bandwidth, disk capacity, network bandwidth, network capacity, processor capacity, processor utilization, memory capacity, and memory utilization of the system.

10. The system of claim 8, wherein the system implements a second shard of the set of shards and the second shard is a member of the replicated state machine.

11. The system of claim 8, wherein the memory further includes computer executable instructions that, upon execution, cause the one or more processors to obtain third utilization information from a third consensus message obtained from a third system hosting a third shard of the set of shards.

12. The system of claim 11, wherein the memory further includes computer executable instructions that, upon execution, cause the one or more processors to:
obtain a request to allocate a block of the system;
determine a utilization rate for the replicated state machine based at least in part on the first utilization information, the second utilization information, and the third utilization information; and
select the system based at least in part on the utilization rate for the replicated state machine.

13. The system of claim 12, wherein the memory further includes computer executable instructions that, upon execution, cause the one or more processors to:
allocate the block in response to the request; and
generate a third consensus message as a result of allocating the block, where the third consensus message includes updated resource utilization information of the system as a result of allocating the block.

14. A non-transitory computer-readable storage medium storing thereon executable instructions that, as a result of being executed by one or more processors of a computer system, cause the computer system to at least:
determine a state change of a replicated state machine, the replicated state machine including a set of shards of which the computer system is a member;
generate a consensus message to indicating a current state of the replicated state machine based at least in part on the state change;
insert, into the consensus message, message utilization information of the computer system; and
provide the consensus message to a second computer system participating in the replicated state machine and executing at least one shard of the set of shards, the consensus message, upon receipt by the second computer system, causing the second computer system to obtain, from the consensus message, the utilization information to determine a utilization rate for the computer system based at least in part on the utilization information.

15. The non-transitory computer-readable storage medium of claim 14, wherein the instructions further comprise instructions that, upon execution by the one or more processors, cause the computer system to receive a second consensus message from the second computer systems, the second consensus message including second utilization information.

16. The non-transitory computer-readable storage medium of claim 15, wherein the instructions further comprise instructions that, upon execution by the one or more processors, cause the computer system to determine to allocate a block of data to the replicated state machine such that allocation of the block of data causes the computer system to minimize a maximum utilization rate of set of shards based at least in part on the second utilization information.

17. The non-transitory computer-readable storage medium of claim 15, wherein the instructions further comprise instructions that, upon execution by the one or more processors, cause the computer system to calculate a utilization rate based at least in part on the second utilization.

18. The non-transitory computer-readable storage medium of claim 17, wherein the instructions the cause the computer system to calculate the utilization rate further comprise instructions that, upon execution by the one or more processors, cause the computer system to calculate the utilization rate by at least multiplying a disk capacity of the second computer system by a first constant and multiplying a network bandwidth of the second computer system by a second constant, where the first constant and the second constant are included in the second utilization information and selected such that the utilization rate is skewed toward the disk capacity or the network bandwidth.

19. The non-transitory computer-readable storage medium of claim 17, wherein the instructions that cause the computer system to calculate the utilization rate further include instructions that cause the computer system to calculate the utilization rate based at least in part on the message and a set of previously obtained messages including resource utilization information of the other computer system.

20. The non-transitory computer-readable storage medium of claim 14, wherein the instructions further comprise instructions that, upon execution by the one or more processors, cause the computer system to query one or more other computer systems executing at least one shard of the set of shard to determine the replicated state machine has sufficient capacity to allocate a block of data.

* * * * *